United States Patent [19]

Lang

[11] 4,334,893
[45] Jun. 15, 1982

[54] RECOVERY OF ALKALI METAL CATALYST CONSTITUENTS WITH SULFUROUS ACID

[75] Inventor: Robert J. Lang, Baytown, Tex.

[73] Assignee: Exxon Research & Engineering Co., Florham Park, N.J.

[21] Appl. No.: 210,089

[22] Filed: Nov. 24, 1980

Related U.S. Application Data

[63] Continuation of Ser. No. 52,055, Jun. 25, 1979, abandoned.

[51] Int. Cl.$^3$ .............................. C10J 3/06; C10J 3/54
[52] U.S. Cl. ....................................... 48/202; 48/210; 252/373; 252/413; 252/420; 423/127
[58] Field of Search ..................... 48/197 R, 202, 210; 252/373, 413, 420; 201/38; 208/9; 423/127, 132, 202, 205, 206 R, 208

[56] References Cited

U.S. PATENT DOCUMENTS 1,148,092 7/1915 Kalmus et al. ..................... 423/127
4,057,512 11/1977 Vodovic et al. ..................... 48/202
4,193,771 3/1980 Sharp et al. ....................... 48/197 R

OTHER PUBLICATIONS

Peters et al., "Methods for Producing Alumina from Clay", Report of Investigators 5997, Bureau of Mines 1962.

Primary Examiner—Peter F. Kratz
Attorney, Agent, or Firm—Yale S. Finkle

[57] ABSTRACT

In a coal gasification operation or similar conversion process carried out in the presence of an alkali metal-containing catalyst wherein solid particles containing alkali metal residues are produced, alkali metal constituents are recovered from the particles primarily in the form of water-soluble alkali metal sulphites and bisulphites by treating the particles with a solution of sulfurous acid. During the treating process the water-insoluble alkali metal compounds in the alkali metal residues are converted into water-soluble alkali metal sulphites and bisulphites, which have been found to be catalytically active. The aqueous solution containing water-soluble alkali metal sulphites and bisulphites is then separated from the treated particles and any insoluble material formed during the treatment process, treated to remove soluble aluminum compounds and recycled to the gasification process where the alkali metal sulphites and bisulphites serve as at least a portion of the alkali metal constituents which comprise the alkali metal-containing catalyst.

11 Claims, 1 Drawing Figure

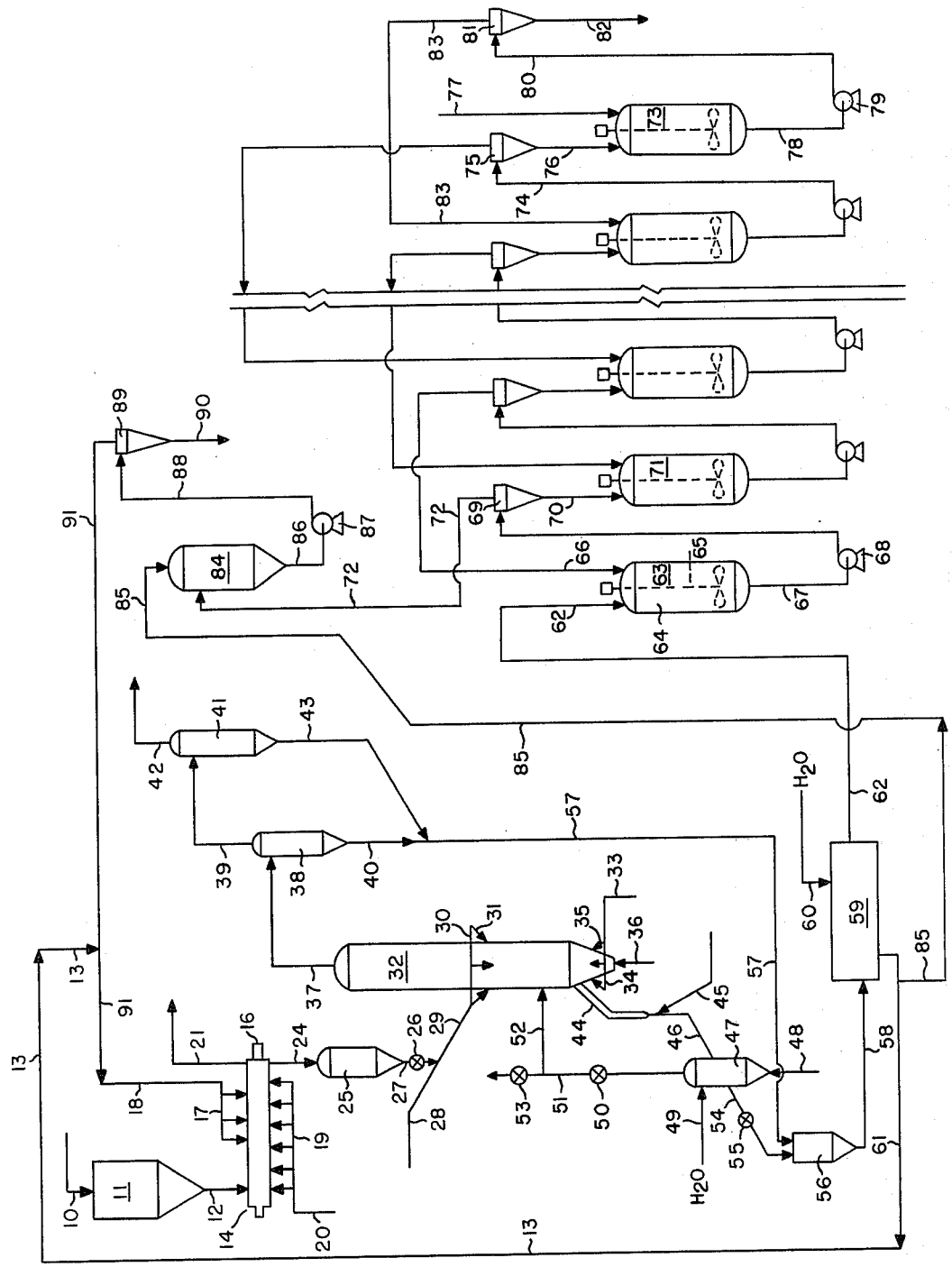

RECOVERY OF ALKALI METAL CATALYST CONSTITUENTS WITH SULFUROUS ACID

This is a continuation of application Ser. No. 052,055, filed June 25, 1979, now abandoned.

BACKGROUND OF THE INVENTION

This invention relates to the conversion of coal and similar carbonaceous solids in the presence of an alkali metal-containing catalyst and is particuarly concerned with the recovery of alkali metal constituents from spent solids produced during coal gasification and similar operations and their reuse as constituents of the alkali metal-containing catalyst.

It has long been recognized that certain alkali metal compounds can be employed to catalyze the gasification of carbonaceous material such as coal and other carbonaceous solids. Studies have shown that potassium carbonate, sodium carbonate, cesium carbonate and lithium carbonate will substantially accelerate the rate at which steam, hydrogen, carbon dioxide, oxygen and the like react with bituminous coal, subbituminous coal, lignite, petroleum coke, organic waste materials and similar carbonaceous solids to form methane, carbon monoxide, hydrogen, carbon dioxide and other gaseous products. Other alkali metal salts such as alkali metal chlorides, however, have a low catalytic activity when compared to that of the corresponding carbonate and will only accelerate the gasification reactions at a fraction of the rate obtainable with alkali metal carbonates. It has been found that of the alkali metal carbonates, cesium carbonate is the most effective gasification catalyst, followed by potassium carbonate, sodium carbonate and lithium carbonate in that order. Because of the relatively high cost of cesium carbonate and the low effectiveness of lithium carbonate, most of the experimental work in this area which has been carried out in the past has been directed toward the use of potassium and sodium carbonate. The catalytic activity of sodium carbonate, however, is substantially lower than that of potassium carbonate, therefore attention has been focused in the past on the use of potassium carbonate as a gasification catalyst.

Coal gasification processes and similar operations carried out in the presence of alkali metal compounds at high temperatures generally result in the formation of chars and alkali metal residues. Coal and other carbonaceous solids used in such operations normally contain mineral constituents that are converted to ash during the gasification process. Although the composition of ash varies, the principle constituents, expressed as oxides, are generally silica, alumina and ferric oxide. The alumina is usually present in the ash in the form of aluminosilicates. Studies indicate that at least a portion of the alkali metal compounds that are used as gasification catalyst constituents react with the aluminosilicates and other ash constituents to form alkali metal residues containing water-soluble alkali metal compounds such as carbonates, sulfates and the like and water-insoluble, catalytically inactive materials such as alkali metal aluminosilicates. Thus the chars produced during coal gasification and similar conversion processes will contain in addition to carbonaceous material and ash, alkali metal residues comprised of both water-soluble alkali metal constituents and water-insoluble alkali metal constituents. It is generally advisable to withdraw a portion of the char from the reaction zone during gasification and similar operations in order to eliminate the ash and alkali metal residues and prevent them from building up within the reaction zone or other vessels in the system. Elutriation methods and other techniques for separating char particles of relatively high ash content and returning particles of relatively low ash content to the reaction zone in order to improve the utilization of carbon in such processes has been suggested.

In gasification and other processes referred to above that utilize alkali metal-containing catalysts, the cost of the alkali metal constituents is a significant factor in determining the overall cost of the process. In order to maintain catalyst cost at a reasonable level, it is essential that the alkali metal consituents be recovered and reused. Since the alkali metal is present in the form of both water-soluble and water-insoluble compounds, not all of the alkali metal constituents can be recovered by water washing alone. It has been proposed to recover the water-insoluble alkali metal constituents by treating the char particles with a solution of sulfuric acid, hydrochloric acid, or formic acid. Although hydrochloric and sulfuric acid are effective in extracting the alkali metal from the char particles, such extraction results in the formation of alkali metal chlorides and alkali metal sulfates, both of which have now been found to be poor gasification catalysts. Extraction with formic acid, on the other hand, results in the formation of an alkali metal formate which is an active gasification catalyst. Formic acid, however, is only effective in extracting a small portion of the water-insoluble alkali metal constituents from the char.

SUMMARY OF THE INVENTION

The present invention provides an improved process for the recovery of alkali metal constituents from mixtures of char and ash produced during coal gasification and other conversion processes carried out in the presence of an alkali metal-containing catalyst. In accordance with the invention, it has now been found that substantial amounts of alkali metal constituents can be effectively recovered from particles containing alkali metal residues produced during coal gasification and related high temperature conversion processes primarily in the form of alkali metal sulphites and alkali metal bisulphites by treating the particles with a solution of sulfurous acid. During the treating process the sulfurous acid reacts with water-insoluble alkali metal compounds present in the alkali metal residues and converts them into water-soluble alkali metal sulphites and bisulphites, which have surprisingly been found to be active gasification catalysts. The alkali metal sulphites and bisulphites present in the aqueous solution produced during the treatment process are used in the conversion process as at least a portion of the alkali metal constituents which comprise the alkali metal-containing catalyst. Preferably, such use is achieved by recycling the solution to the conversion process. If desired, however, the alkali metal sulphites and bisulphites may first be recovered from the solution and then used in the conversion process. The aqueous solution produced in the treatment step may contain a substantial amount of water-soluble aluminum compounds. If such is the case, it will normally be desirable to increase the pH of the solution to precipitate out the aluminium before the solution is recycled to the conversion process.

The process of the invention, unlike similar processes proposed in the past, results in the recovery of substantially all of the alkali metal tied up as water-insoluble compounds in the alkali metal residues in a form that is catalytically active. Thus, the recovered alkali metal constituents can be directly reused in the conversion process as a portion of the alkali metal catalyst thereby decreasing the amount of active makeup alkali metal compounds that is required. As a result, the invention makes possible substantial savings in gasification and other conversion operations carried out in the presence of alkali metal-containing catalysts and permits the generation of product gases and/or liquids at a significantly lower cost than would otherwise be the case.

BRIEF DESCRIPTION OF THE DRAWING

The drawing is a schematic flow diagram of a catalytic coal gasification process in which alkali metal constituents of the catalyst are recovered and reused in the process.

DESCRIPTION OF THE PREFERRED EMBODIMENTS

The process depicted in the drawing is one for the production of methane by the gasification of a bituminous coal, subbituminous coal, lignite or similar carbonaceous solids with steam at high temperature in the presence of a carbon-alkali metal catalyst prepared by impregnating the feed solids with a solution of an alkali metal compound or a mixture of such compounds and thereafter heating the impregnated material to a temperature sufficient to produce an interaction between the alkali metal and carbon present. It will be understood that the alkali metal recovery system disclosed is not restricted to this particular gasification process and that it can be employed in conjunction with any of a variety of other conversion processes in which alkali metal compounds or carbon-alkali metal catalysts are used to promote the reaction of steam, hydrogen, oxygen or the like with carbonaceous feed materials to produce a char, coke or similar solid product containing alkali metal residues from which alkali metal compounds are recovered for reuse as the catalyst or a constituent of the catalyst. It can be employed, for example, for the recovery of alkali metal compounds from various processes for the gasification of coal, petroleum coke, lignite, organic waste materials and similar solids feed streams which produce spent carbonaceous solids. Other conversion processes with which it may be used include operations for the carbonization of coal and similar feed solids, for the liquefaction of coal and related carbonaceous materials, for the retorting of oil shale, for the partial combustion of carbonaceous feed materials, and the like. Such processes have been disclosed in the literature and will be familiar to those skilled in the art.

In the process depicted in the drawing, a solid carbonaceous feed material such as bituminous coal, subbituminous coal, lignite or the like that has been crushed to a particle size of about 8 mesh or smaller on the U.S. Sieve Series Scale is passed into line 10 from a feed preparation plant or storage facility that is not shown in the drawing. The solids introduced into line 10 are fed into a hopper or similar vessel 11 from which they are passed through line 12 into feed preparation zone 14. This zone contains a screw conveyor or similar device, not shown in the drawing, that is powered by a motor 16, a series of spray nozzles or similar devices 17 for the spraying of alkali metal-containing solution supplied through line 18 onto the solids as they are moved through the preparation zone by the conveyor, and a similar set of nozzles or the like 19 for the introduction of steam into the preparation zone. The steam, supplied through line 20, serves to heat the impregnated solids and drive off the moisture. In order to prevent oxidation of alkali metal constituents in the feed preparation zone, it is important that no air or any other gas containing molecular oxygen be introduced into the preparation zone. Steam is withdrawn from zone 14 through line 21 and passed to condenser, not shown, from which it may be recovered for use as makeup water or the like. The alkali metal-containing solution is recycled through lines 13 and 91 from the alkali metal recovery section of the process, which is described in detail hereafter.

It is preferred that sufficient alkali metal-containing solution be introduced into feed preparation zone 14 to provide from about 1 to about 50 weight percent of the alkali metal compound or mixture of such compounds on the coal or other carbonaceous solids. From about 5 to about 20 weight percent is generally adequate. The dried impregnated solid particles prepared in zone 14 are withdrawn through line 24 and passed to a closed hopper or similar vessel 25. From here they are discharged through a star wheel feeder or equivalent device 26 in line 27 at an elevated pressure sufficient to permit their entrainment into a stream of high pressure steam, recycle product gas, inert gas or other carrier gas introduced into line 29 via line 28. The carrier gas and entrained solids are passed through line 29 into manifold 30 and fed from the manifold through feed lines 31 and nozzles, not shown in the drawing, into gasifier 32. In lieu of or in addition to hopper 25 and star wheel feeder 26, the feed system may employ parallel lock hoppers, pressurized hoppers, aerated standpipes operated in series, or other apparatus to raise the input feed solids stream to the required pressure level.

It is generally preferred to operate the gasifier 32 at a pressure between about 100 and about 2000 psig. The carrier gas and entrained solids will normally be introduced at a pressure somewhat in excess of the gasifier operating pressure. The carrier gas may be preheated to a temperature in excess of about 300° F. but below the initial softening point of the coal or other feed material employed. Feed particles may be suspended in the carrier gas in a concentration between about 0.2 and about 5.0 pounds of solid feed material per pound of carrier gas. The optimum ratio for a particular system will depend in part upon feed particle size and density, the molecular weight of the gas employed, the temperature of the solid feed material and input gas stream, the amount of alkali metal compound employed and other factors. In general, ratios between about 0.5 and about 4.0 pounds of solid feed material per pound of carrier gas are preferred.

Gasifier 32 comprises a refractory lined vessel containing a fluidized bed of carbonaceous solids extending upward within the vessel above an internal grid or similar distribution device not shown in the drawing. The bed is maintained in the fluidized state by means of steam introduced through line 33, manifold 34 and peripherally spaced injection lines and nozzles 35 and by means of recycle hydrogen and carbon monoxide introduced through bottom inlet line 36. The particular injection system shown in the drawing is not critical and hence other methods for injecting the steam and recycle hydrogen and carbon monoxide may be employed. In some instances, for example, it may be preferred to introduce both the steam and recycle gases through multiple nozzles to obtain more uniform distribution of the injected fluid and reduce the possibility of channeling and related problems. The space velocity of the rising gases within the fluidized bed will normally be between about 300 and 3000 volumes of steam and recycle hydrogen and carbon monoxide per hour per volume of fluidized solids.

The injected steam reacts with carbon in the feed material in the fluidized bed in gasifier 32 at a temperature within the range between about 800° F. and about 1600° F., preferably between about 1100° F. and 1400° F. and at a pressure between about 100 and about 2000 psig, preferably between about 200 and about 500 psig. Due to the equilibrium conditions existing in the bed as the result of the presence of the carbon-alkali metal catalyst and the recycle hydrogen and carbon monoxide injected near the lower end of the bed, the net reaction products will normally consist essentially of methane and carbon dioxide. The ratio of methane to carbon dioxide in the raw product gas thus formed will preferably range from about 1 to about 1.4 moles per mole, depending upon the amount of hydrogen and oxygen in the feed coal or other carbonaceous solids. The coal employed may be considered as an oxygenated hydrocarbon for purposes of describing the reaction. Wyodak coal, for example, may be considered as having the approximate formula $CH_{0.84}O_{0.20}$, based on the ultimate analysis of moisture and ash-free coal and neglecting nitrogen and sulfur. The reaction of this coal with steam to produce methane and carbon dioxide is as follows:

$$1.24H_2O(g) + 1.8CH_{0.84}O_{0.20} \rightarrow 0.8CO_2 + CH_4$$

Under the same gasification conditions, coals of higher oxygen content will normally produce lower methane to carbon dioxide ratios and those of lower oxygen content will yield higher methane to carbon dioxide ratios.

The gas leaving the fluidized bed in gasifier 32 passes through the upper section of the gasifier, which serves as a disengagement zone where particles too heavy to be entrained by the gas leaving the vessel are returned to the bed. If desired, this disengagement zone may include one or more cyclone separators or the like for removing relatively large particles from the gas. The gas withdrawn from the upper part of the gasifier through line 37 will normally contain methane, carbon dioxide, hydrogen and carbon monoxide produced by the reaction of the steam with carbon, unreacted steam, hydrogen sulfide, ammonia and other contaminants formed from the sulfur and nitrogen contained in the feed material, and entrained fines. This gas is introduced into cyclone separator or similar device 38 for removal of the larger fines. The overhead gas then passes through line 39 into a second separator 41 where smaller particles are removed. The gas from which the solids have been separated is taken overhead from separator 41 through line 42 and the fines are discharged downward through dip legs 40 and 43. These fines may be returned to the gasifier or passed to the alkali metal recovery section of the process as discussed hereafter.

After entrained solids have been separated from the raw product gases described above, the gas stream may be passed through suitable heat exchange equipment for the recovery of heat and then processed for the removal of acid gases. Once this has been accomplished, the remaining gas, consisting primarily of methane, hydrogen and carbon monoxide, may be cryogenically separated into a product methane stream and a recycle stream of hydrogen and carbon monoxide, which is returned to the gasifier through line 36. Conventional gas processing equipment can be used. Since a detailed description of this downstream gas processing portion of the process is not necessary for an understanding of the invention, it has been omitted.

The fluidized bed in gasifier 32 is comprised of char particles formed as the solid carbonaceous feed material undergoes gasification. The composition of the char particles will depend upon the amount of mineral matter present in the carbonaceous material fed to the gasifier, the amount of the alkali metal compound or mixture of such compounds impregnated into the feed material, and the degree of gasification that the char particles undergo while in the fluidized bed. The lighter char particles, which will have a relatively high content of carbonaceous material, will tend to remain in the upper portion of the fluidized bed. The heavier char particles, which will contain a relatively small amount of carbonaceous material and a relatively large amount of ash and alkali metal residues, will tend to migrate toward the bottom of the fluidized bed. A portion of the heavier char particles is normally withdrawn from the bottom portion of the fluidized bed in order to eliminate ash and thereby prevent it from building up within the gasifier the other vessels in the system.

The process of this invention is based in part upon the fact that alkali metal constituents of the gasification catalyst react with the mineral constituents of the coal and other carbonaceous solids during the gasification process. Studies have indicated that at least a portion of the alkali metal compounds, such as potassium carbonate, sodium carbonate and the like, that are used as gasification catalyst constituents react with the aluminosilicates and other ash constituents to form alkali metal residues containing water-soluble alkali metal compounds such as carbonates, sulfates, sulfides and the like and catalytically inactive materials such as alkali metal aluminosilicates, alkali metal iron sulfides and other water-insoluble compounds.

It has been found that from about 10 to about 50 percent by weight of the potassium carbonate or other alkali metal compound employed to impregnate the coal or similar feed material prior to gasification will react with the aluminosilicates and other ash constituents during gasification to form alkali metal aluminosilicates, alkali metal iron sulfides and other water-insoluble catalyst residues which cannot normally be recovered from the ash by water washing. Preliminary studies tend to indicate that when potassium carbonate is utilized to impregnate the coal, one of the major constituents of the water-insoluble alkali metal residues produced is a synthetic kaliophilite, which has the chemical formula $KAlSiO_4$.

To improve the economics of the catalytic gasification process described above and other catalytic conversion processes where water-insoluble alkali metal residues are formed, it is desirable to recover as much as possible of the alkali metal constituents from the insoluble residues and reuse them as catalyst constituents in the conversion process, thereby decreasing the amount of costly makeup alkali metal compounds needed. It has been found that a substantial amount of the alkali metal constituents in the water-insoluble alkali metal residues withdrawn with the char and ash from the gasifier of the above-described process or the reaction zone of other conversion processes can be recovered for reuse in the conversion process by treating the particles withdrawn from the reaction zone with a solution of sulfurous acid formed by dissolving sulfur dioxide in an aqueous medium at a temperature between about ambient and about 200° F. and a pressure between about atmospheric and about 100 psig. Normally the sulfurous acid treatment will be carried out at ambient temperature and atmospheric pressure. During the treating process the sulfurous acid reacts with water-insoluble alkali metal compounds in the alkali metal residues thereby converting them into water-soluble alkali metal sulphites and bisulphites which pass into solution. The water-soluble alkali metal sulphites and bisulphites present in the resulting aqueous solution are then used in the conversion process as at least a portion of the alkali metal constituents which comprise the alkali-metal containing catalyst. Alkali metal sulphites and bisulphites have been found to exhibit surprisingly high activity when used to catalyze the gasification of carbonaceous material.

Referring again to the drawing, char particles containing carbonaceous material, ash and alkali metal residues are continuously withdrawn through line 44 from the bottom of the fluidized bed in gasifier 32. The particles flow downward through line 44 countercurrent to a stream of steam or other elutriating gas introduced through line 45. Here a preliminary separation of solids based on differences in size and density takes place. The lighter particles having a relatively large amount of carbonaceous material tend to be returned to the gasifier and the heavier particles having a relatively high content of ash and alkali metal residues continue downward through line 46 into fluidized bed withdrawl zone 47. Steam or other fluidizing gas is introduced into the bottom of the withdrawal zone through line 48 to maintain the bed in the fluidized state. Water may be introduced through line 49 in order to cool the particles and facilitate their further processing. The withdrawal rate is controlled by regulating the pressure within zone 47 by means of throttle valve 50 in overhead line 51. The gases from line 51 may be returned to the gasifier through line 52 or vented through valve 53. From vessel 47 the solid particles are passed through line 54 containing valve 55 into hopper 56.

The solid particles in hopper 56 are now ready for treatment to recover alkali metal constituents. Normally, the soluble alkali metal constituents are recovered by water washing these particles. The process of this invention, in addition to being used to recover alkali metal constituents from water-insoluble alkali metal residues formed during gasification or other conversion processes, may also be used to recover soluble alkali metal constituents from the water-soluble alkali metal residues present in these particles. Elimination of the water wash step, however, may not be desirable since the water-soluble alkali metal constituents that are normally removed in this step will be present when the particles are treated with the sulfurous acid and may tend to react with that compound, thereby substantially increasing the amount of the acid needed as compared to the amount that would be required if the compound was consumed only by the reactions that solubilize the alkali metal constituents from the water-insoluble alkali metal compounds present in the residues. Thus one of the factors in determining whether or not the water wash step should be eliminated will normally be the cost of the increased amount of sulfurous acid required versus the cost of the water wash step.

The process depicted in the drawing utilizes a water wash step before the particles are treated to recover alkali metal constituents or compounds from the water-insoluble alkali metal residues. The solid particles in hopper 56 are combined with char fines recovered from the raw product gas through dip legs 40 and 43 and line 57 and are fed through line 58 into water wash zone 59. The water wash zone will normally comprise a multistage countercurrent extraction system in which the particles are countercurrently contacted with water introduced through line 60. An aqueous solution of alkali metal compounds such as alkali metal carbonates, hydroxides, sulfates and the like are recovered from the unit and may be recycled through lines 61, 13, 91 and 18 to feed preparation zone 14. Here the coal or similar carbonaceous feed material is impregnated with the alkali metal compounds recovered from the water-soluble alkali metal residues in the water wash step and from the water-insoluble alkali metal residues as described hereafter.

Particles from which substantially all of the water-soluble alkali metal constituents have been extracted are withdrawn from the water wash zone in slurry form through line 62. Although the water-soluble alkali metal constituents have been removed from the particles, substantial quantities of alkali metal constituents will still be present in the form of water-insoluble alkali metal residues. These water-insoluble alkali metal constituents are recovered from the solid particles by passing them through a multistage countercurrent sulfurous acid extraction unit which includes a plurality of tanks or vats, classifiers, screw-fed contactors, thickeners, continuous centrifuges or the like. The number of actual stages employed in the extraction system will depend to a large extent upon the composition of the solids fed to the system and the particular contacting conditions utilized. Each stage in the particular system shown in the drawing includes a closed vat or tank containing a stirrer, means for countercurrent circulation of liquids and solids from one tank to another, and a hydroclone, filter, centrifuge or similar liquid-solids separation device and means, not shown, for maintaining a blanket of inert gas free of molecular oxygen in each stage to prevent contact of the slurry with air.

The solids in line 62 are passed into the final stage 63 of the multistage liquid-solids extraction train. This stage comprises a mixing tank 64 which contains a stirrer 65. In the mixing tank the solids are slurried with an aqueous solution containing sulfurous acid and a relatively high concentration of alkali metal sulphites and bisulphites introduced into the tank through line 66 and the resultant slurry is agitated by the stirrer. The temperature in the tank is normally maintained in the range between about ambient and about 200° F., while the tank is held at a pressure between atmospheric and about 100 psig. Water-insoluble alkali metal compounds present in the solid particles react with the sulfurous acid and are converted into water-insoluble alkali metal sulphites and bisulphites. The slurry in tank 63 is kept under an inert atmosphere free of molecular oxygen by passing steam, nitrogen, carbon dioxide or a similar inert gas through the tank to create a positive pressure and prevent air from entering the tank and contacting the slurry.

The slurry which is formed in stage 63 is withdrawn from the bottom of tank 64 through line 67 and circulated by means of pump 68 to hydroclone, centrifuge, filter or similar liquid-solids separation device 69 where the solids are removed from the liquid. These solids, from which a portion of the water-insoluble alkali metal constituents have been extracted, are discharged through line 70 into stage 71 of the apparatus. The liquid separated from the solids in hydroclone 69, richer in alkali metal sulphites and bisulphites and leaner in sulfurous acid than the liquid in stage 71, is withdrawn from the hydroclone through line 72 and passed to the downstream portion of the system for removal of aluminum, silicon and iron compounds as described hereafter.

Stage 71 and the other intermediate stages of the recovery train are generally similar to stage 63. In each of these stages, solids separated from a liquid stream, which has a relatively high concentration of alkali metal sulphites and bisulphites and a relatively low concentration of sulfurous acid, in the hydroclone or other liquid-solids separator associated with that stage are discharged into a solution less concentrated in alkali metal sulphites and bisulphites and more concentrated in sulfurous acid and the liquid stream from the hydroclone or similar device is passed downstream for contact with solids having a higher content of water-insoluble alkali metal residues. Slurry from each stage is pumped to the hydroclone in the adjacent upstream stage for separation into liquid and solid components. Steam, nitrogen, carbon dioxide or similar inert gas substantially free of air or molecular oxygen is continuously passed through the slurry to maintain an inert atmosphere in the tank and thereby prevent oxidation of the alkali metal sulphites and bisulphites into catalytically inactive alkali metal sulphates. In the initial stage 73 of the train, incoming slurry from the second stage flows through line 74 to hydroclone or the like 75, from which the solids are discharged through line 76 into a concentrated solution of sulfurous acid introduced into the stage through line 77. The concentrated solution of sulfurous acid is produced by dissolving sulfur dioxide in water in a mixing tank, which is not shown in the drawing. The sulfur dioxide needed to produce the sulfurous acid solution will normally be obtained by burning a portion of hydrogen sulphide recovered from the gaseous products exiting the process through line 42. Such a burning will normally be carried out in the sulfur recovery portion of the product gas downstream processing scheme.

The slurry formed in initial stage 73 by the mixing of the sulfurous acid solution with solids from which most of the water-insoluble alkali metal consitutents have been extracted comprises solid particles in a solution containing a low concentration of alkali metal sulphites and bisulphites. The slurry is withdrawn through line 78 by means of pump 79 and passed through line 80 to hydroclone or similar device 81. The solids withdrawn from the hydroclone through line 82 will normally consist primarily of neutralized ash and will contain only small amounts of carbon and alkali metal compounds. This material may be disposed of by landfill, used for construction purposes, or employed in other applications. The solution recovered from hydroclone 81, which has a low concentration of alkali metal sulphites and bisulphites and a high concentration of sulfurous acid, is passed through line 83 to the second stage of the recovery train.

It will be apparent from the foregoing that the alkali metal extraction portion of the process of the invention results in the recovery of alkali metal constituents, primarily in the form of alkali metal sulphites and bisulphites from the solids to produce a relatively concentrated alkali metal solution which is withdrawn from the extraction system through line 72. This solution contains aluminum, silicon and iron compounds in addition to alkali metal sulphites and bisulphites. Studies indicate that these compounds are present as a result of high temperature solid phase reactions of the alkali metal-containing catalyst with kaolin-type coal minerals such as $Al_2SiO_7 \cdot 2H_2O$ and iron compounds in the carbonaceous feed material during gasification or similar conversion process. For potassium carbonate, for example one of these reactions can be represented as follows:

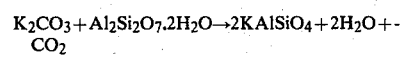

$$K_2CO_3 + Al_2Si_2O_7 \cdot 2H_2O \rightarrow 2KAlSiO_4 + 2H_2O + CO_2$$

The extent to which this reaction takes place is a function of time and temperature. The potassium aluminosilicate or kaliophilite which is thus formed reacts with the sulfurous acid during the extraction step of the process to form soluble aluminum and silicon compounds. This reaction can be represented by the following equation:

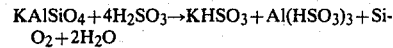

$$KAlSiO_4 + 4H_2SO_3 \rightarrow KHSO_3 + Al(HSO_3)_3 + SiO_2 + 2H_2O$$

Almost all of the aluminum remains in solution as aluminum sulphite or bisulphite and about half of the silicon is found in the form of undissolved silicon dioxide. Some of the dissolved silicon may be found in solution in the form of orthosilic acid, $H_4SiO_4$. If the solution used to impregnate the feed coal with alkali metal constituents contains a substantial amount of soluble aluminum, silicon and iron compounds, these compounds will react under gasifier conditions with the alkali metal to form alkali metal aluminosilicate and alkali metal iron sulfide which have relatively little catalytic activity. To avoid this tying up of the alkali metal constituents in the form of compounds having reduced activity, it is preferable to remove soluble aluminum, silicon, and iron compounds from the enriched alkali metal solution before it is returned to feed preparation zone 14.

Soluble aluminum, silicon, and iron compounds are separated from the alkali metal solution by introducing the solution from line 72 into an agitated mixer or similar vessel 84. Here the solution is mixed with sufficient base introduced through line 85 to raise the pH of the solution to a value in the range between about 4.0 and about 9.0. The increase in pH results in the precipitation of aluminum, silicon and iron oxides and/or hydroxides. If sufficient base is added to make the solution basic, the alkali metal bisulphites will be converted into alkali metal sulphites. Any of a variety of bases can be employed to precipitate the aluminum, silicon and iron but it is generally preferred to employ a portion of the basic alkali metal solution in line 61 which is obtained by water washing the gasifier char particles in water wash zone 59. This solution is removed from line 61 and passed through line 85 to agitated mixer 84. The amount of base required will depend in part, of course, on the pH of the solution recovered from the sulfurous acid extraction step of the process, the amount of soluble aluminum, silicon and iron compounds present, and the concentration of the basic solution used. The amount of soluble aluminum, silicon and iron compounds in the solution passed to agitated mixer 84 may be decreased by increasing the temperatures in the stages comprising the extraction system thereby causing some of these soluble compounds to precipitate prior to the solution exiting final stage 63 through line 67.

The slurry of precipitated aluminum, silicon, and iron compounds in the alkali metal solution which is produced in vessel 84 is withdrawn through line 86 and passed by means of pump 87 through line 88 to hydroclone or other liquid-solids separation device 89. The precipitated compounds are recovered as underflow from the hydroclone through line 90 and can be further processed for the recovery of aluminum as the metal or the production of other aluminum compounds. The recovered aluminum constitutes a valuable by-product of the process of the invention. The aqueous solution withdrawn overhead of hydroclone 89 through line 91 will contain primarily alkali metal sulphites and bisulphites and is mixed with the alkali metal solution in line 13, which is a portion of the solution recovered from water wash zone 59. The combined solution is recycled to feed preparation zone 14 through lines 18 and 17. Here the coal or similar carbonaceous feed material is impregnated with the alkali metal sulphites, bisulphites and other alkali metal constituents present in the combined aqueous solution. Normally, the impregnation is carried out in such a manner as to avoid contact of the solution with air since molecular oxygen may have a tendency to oxidize the catalytically active alkali metal constituents and thereby convert them into inactive catalyst constituents such as alkali metal sulphates.

In the embodiment of the invention shown in the drawing and described above, particles containing alkali metal residues produced by impregnating a coal with an alkali metal-containing catalyst and subsequently gasifying the coal are treated for the recovery of water-soluble alkali metal sulphites and bisulphites by subjecting the particles to an extraction with an aqueous solution of sulfurous acid in a countercurrent multistage acid extraction system. The recovered alkali metal sulphites and bisulphites are then used as a portion of the alkali metal-containing catalyst. It will be understood that the process of the invention is not limited to the particular alkali metal recovery system described and can be used in conjunction with any type of alkali metal recovery system, including a one-stage extraction system, in which particles containing alkali metal residues are contacted with sulfurous acid. It will also be understood that the process of the invention is not limited to recovering alkali metal constituents in the form of sulphites and bisulphites for reuse as a portion of the gasification catalyst but includes any gasification process in which an alkali metal sulphite or bisulphite is used as a gasification catalyst with or without a subsequent recovery step. For example, a process in which a carbonaceous feed material is injected into a gasifier along with an alkali metal bisulphite or alkali metal sulphite and then subjected to gasification conditions is considered to be within the scope of the invention. It makes no difference how the alkali metal sulphite or bisulphite is injected into the gasifier. It may be injected by impregnating the coal with an aqueous solution of the sulphite or the bisulphite, by mixing the feed material with the solid alkali metal sulphite or bisulphite or by injecting the feed material and the alkali metal sulphite and bisulphite separately into the gasifier.

The nature and objects of the invention are further illustrated by the results of a series of laboratory tests. The first series of tests illustrates that alkali metal sulphites are active gasification catalysts. The second series of tests indicates that sulfurous acid will extract an active catalyst from pure kaliophilite, $KAlSiO_4$. The third series of tests illustrates that sulfurous acid will extract the majority of the water-insoluble alkali metal compounds present in a char produced by gasifying a solid carbonaceous feed material impregnated with an alkali metal-containing catalyst.

In the first series of tests, about two grams of Illinois No. 6 coal crushed to between about 30 and about 50 mesh on the U.S. Sieve Series Scale were mixed with finely divided alkali metal compounds. The resultant mixture was then dampened with about one milliliter of distilled water and pyrolyzed for about fifteen minutes at about 1400° F. in a retort under an inert nitrogen atmosphere. A portion of the resultant char, containing between about 0.2 and about 0.5 grams of carbon, was then steam-gasified at a temperature of about 1300° F. and essentially atmospheric pressure in a laboratory bench scale gasification unit. The gasification rate obtained for each char sample was determined. The char not gasified was ashed to determine the amount of carbon present and the alkali metal cation-to-carbon atomic ratio was then calculated. The results of these tests are set forth below in Table 1.

TABLE I

CATALYTIC ACTIVITY OF ALKALI METAL COMPOUNDS ON ILLINOIS COAL

| Alkali Metal Compound | Atomic Ratio (cation/carbon $\times 10^2$) | Gasification Rate* (% carbon/hr) |
|---|---|---|
| $K_2CO_3$ | 5.50 | 125 |
| $NaCO_3$ | 5.53 | 52 |
| $K_2SO_3$ | 5.42 | 107 |
| $Na_2SO_3$ | 5.63 | 78 |
| $K_2SO_4$ | 5.43 | 8 |
| KCl | 6.55 | 16 |

*Weighted average rate over interval of 0–90% carbon conversion at an average steam rate of 7.5 w/w/hr.

As can be seen from Table 1, potassium carbonate yields the highest gasification rate of the alkali metal compounds utilized as a gasification catalyst. Potassium sulphite has a gasification rate of 107 percent per hour which is only slightly less than that for potassium carbonate and much higher than that for potassium sulfate, which has a gasification rate of only 8 percent carbon per hour. The gasification rate for sodium sulphite is higher than that for sodium carbonate. Table 1 makes it clear that alkali metal sulphites are relatively active gasification catalysts; whereas alkali metal sulfates and alkali metal chlorides are relatively inactive catalysts.

The second series of tests illustrates that under certain conditions sulfurous acid can be used to activate potassium tied up as water-insoluble, catalytically inactive $KAlSiO_4$. In run 1, 0.76 grams of $KAlSiO_4$ were mixed with about 2 grams of Illinois No. 6 coal crushed to between about 30 and 50 mesh on the U.S. Sieve Series Scale and the resultant mixture was slurried in about there milliliters of water. Gaseous sulfur dioxide was then bubbled through the slurry to form an aqueous sulfurous acid solution. Two milliliters of water was removed from the slurry and the resultant residue was pyrolyzed for about fifteen minutes at 1400° F. in a retort under an inert nitrogen atmosphere. A portion of the resultant char was steam-gasified as described in the preceeding series of tests and the gasification rate was measured. In run 2 substantially pure $KAlSiO_4$ was extracted with the sulfurous acid and the resultant solution was neutralized to a pH of 7.0 with ammonium hydroxide in order to precipitate soluble aluminum and silicon compounds. The supernatant solution thus produced was then used to impregnate Illinois No. 6 coal which was pyrolyzed and gasified as described in the first series of tests. During run 2 nitrogen blanketing was used to eliminate air contact during the extraction and subsequent pyrolysis. In run 3 a procedure similar to that in run 2 was followed except that no effort was made to eliminate air contact by nitrogen blanketing. The results of the three runs are set forth below in Table II.

TABLE II

| Run | Nitrogen Blanketing | Neutralization | Gasification Rate* (% carbon/hour) |
|---|---|---|---|
| 1 | Yes | No | 12 |
| 2 | Yes | Yes | 107 |
| 3 | No | Yes | 22 | tracted char. A portion of this char was then completely burned and the resultant ash was analyzed for the same elements. The water-extracted char was then subjected to another water wash and a portion of that char was ashed and analyzed. A portion of the char from the second water wash was washed with sulfurous acid by slurrying the char was with 30 milliliters of sulfurous acid produced by bubbling sulfur dioxide through water for fifteen minutes and then bubbling sulfur dioxide through the slurry for fifteen minutes. The char exiting this wash was again similarly washed with sulfurous acid and then twice with water. After each of these washes a portion of the extracted char was combusted and the resultant ash analyzed for the same elements expressed as oxides on a moisture-free basis. The results of these tests are set forth below in Table III.

TABLE III

| | | SULFUROUS ACID EXTRACTION OF GASIFICATION CHAR | | | | | | | |
|---|---|---|---|---|---|---|---|---|---|
| Ash Elements | Amount Initially Present (gms) | Amount After Water Washes (gms) | | Percent Extracted | Amount After $H_2SO_3$ Washes (gms) | | Amount After Water Washes (gms) | | Percent Extracted |
| | | I | II | | I | II | III | IV | |
| $SiO_2$ | 23.46 | 19.78 | 18.42 | 21.5 | 12.21 | 11.99 | 11.50 | 11.40 | 51.4 |
| $Al_2O_3$ | 8.05 | 7.53 | 7.09 | 11.9 | 2.89 | 1.95 | 1.68 | 1.59 | 80.3 |
| $Fe_2O_3$ | 6.66 | 7.00 | 5.37 | 19.4 | 1.68 | .96 | .47 | .40 | 94.0 |
| MgO | .54 | .52 | .47 | | .23 | .13 | .08 | .07 | |
| CaO | 1.51 | 1.63 | 1.43 | | .54 | .36 | .21 | .23 | |
| $Na_2O$ | 1.16 | .49 | .27 | 76.7 | .10 | .13 | .04 | .03 | 97.4 |
| $K_2O$ | 39.11 | 22.07 | 16.77 | 57.1 | 5.80 | 1.59 | 1.51 | .95 | 97.6 |
| $TiO_2$ | .37 | .38 | .35 | | .34 | .26 | .29 | .30 | |
| $P_2O_5$ | .16 | .14 | .16 | | .08 | .07 | .08 | .09 | |
| $SO_3$ | 18.99 | 12.61 | 7.85 | | 3.10 | .80 | .46 | .22 | |
| TOTAL | 100.01 | 72.15 | 58.18 | | 26.97 | 18.24 | 16.32 | 15.28 | |

*Weighted average rate over interval of 0–90% carbon conversion at an average steam rate of 7.5 w/w/hr.

It can be seen from run 2 in Table II that sulfurous acid extraction of $KAlSiO_4$ yields an active gasification catalyst. The data from run 1, however, tend to indicate that a high gasification activity may not be obtained if the extracted solution is not neutralized to precipitate soluble aluminum and silicon compounds prior to impregnating the coal with the extracted solution. Evidently the low gasification rate obtained in run 1 is the result of the aluminum and silicon compounds reacting again with the active potassium sulphite produced during extraction to form water-insoluble and inactive potassium aluminosilicates. The low gasification rate obtained in run 3 is apparently due to the fact that the potassium sulphite and bisulphite formed during extraction are oxidized to inactive potassium sulfate by exposure to air. The data from run 3 suggests that the sulfurous acid extraction and feed impregnation portion of the process of the invention should be carried out in the substantial absence of air or molecular oxygen.

The third series of tests illustrates that sulfurous acid can be used to effectively convert water-insoluble potassium residues in a char produced by gasifying a coal impregnated with an aqueous solution of a water-soluble potassium compound into water-soluble potassium constituents. A sample of char produced by the fluid bed gasification of Illinois No. 6 coal impregnated with an aqueous solution of potassium carbonate was obtained. A portion of this char was completely burned and the resultant ash was analyzed for various elements expressed as oxides on a moisture-free basis. Eight grams of the remaining char was shaken with thirty milliliters of water for fifteen minutes and the resultant aqueous solution was separated from the water ex- It can be seen from the data in Table III that after two water washes about 58% of the potassium present was extracted from the char thereby leaving about 42% as water-insoluble compounds. After the two sulfurous acid washes followed by the third and fourth water washes, only 0.95 grams of the original potassium in the char remained. The sulfurous acid wash as effective in converting all but 0.95 grams of the 16.77 grams of the potassium remaining after the first two water washes. The data also show that the sulfurous acid wash will also solubilize some of the other water-insoluble ash constituents such as aluminum, silicon and iron compounds.

It will be apparent from the foregoing that the invention provides a process which makes it possible to recover increased amounts of catalytically active alkali metal constituents from mixtures of alkali metal residues, ash, and char produced during catalytic gasification and similar high temperature conversion processes. As a result, the need for costly makeup alkali metal compounds is reduced thereby lowering the overall cost of the conversion process.

I claim:

1. In a process for the catalytic steam gasification of coal in the presence of a potassium-containing catalyst at a temperature between about 1100° F. and about 1400° F. wherein particles containing potassium residues are produced, the improvement which comprises:
   (a) treating said particles containing said potassium residues with a solution of sulfurous acid thereby converting water-insoluble potassium constituents in said residues into water-soluble potassium sulfites and bisulfites and producing an aqueous solution containing water-soluble potassium constituents including said potassium sulfites and bisulfites; and (b) using said potassium sulfites and bisulfites in said aqueous solution in said catalytic steam gasification process as at least a portion of the potassium constituents comprising said potassium-containing catalyst.

2. A process as defined in claim 1 wherein said treatment step is carried out in the substantial absence of air or molecular oxygen.

3. A process as defined in claim 1 including the additional step of water washing said particles containing said potassium residues before said particles are treated with said solution of sulfurous acid.

4. A process as defined in claim 1 wherein said aqueous solution is recycled to said catalytic steam gasification process where said potassium sulfites and bisulfites are used as at least a portion of said potassium constituents comprising said potassium-containing catalyst.

5. A process as defined in claim 1 including the additional step of raising the pH of said aqueous solution sufficiently to precipitate aluminum compounds contained in said solution prior to recycling said solution to said catalytic steam gasification process.

6. A process as defined in claim 5 wherein said treatment step, said pH raising step, and said recycle step are carried out in the substantial absence of air or molecular oxygen.

7. A process as defined in claim 1 wherein said particles are treated with said solution of sulfurous acid in a multistage countercurrent extraction system.

8. In a process for the catalytic steam gasification of coal in the presence of a potassium-containing catalyst wherein particles containing potassium residues are produced, the improvement which comprises:

(a) washing said particles containing said potassium residues with water to form an aqueous solution containing water-soluble potassium constituents and particles containing potassium residues depleted in water-soluble potassium constituents;

(b) contacting the particles formed in step (a) with a solution of sulfurous acid to convert the water-insoluble potassium constituents in said residues into water-soluble potassium sulfites and bisulfites, and produce an aqueous solution containing said water-soluble potassium sulfites and bisulfites and water-soluble aluminum compounds;

(c) raising the pH of said aqueous solution containing said water-soluble potassium sulfites and bisulfites and said water-soluble aluminum compounds sufficiently to cause water-insoluble aluminum compounds to precipitate, thereby forming an aqueous solution containing primarily water-soluble potassium sulfites and bisulfites substantially free of aluminum; and (d) recycling said aqueous solution formed in step (c) to said catalytic steam gasification process where said potassium sulfites and bisulfites are used as at least a portion of the potassium constituents comprising said potassium-containing catalyst.

9. A process as defined in claim 8 wherein steps (b),(c) and (d) are carried out in the substantial absence of air or molecular oxygen.

10. A process as defined in claim 8 wherein the pH of said aqueous solution produced in step (b) is raised by adding a portion of the aqueous solution containing water-soluble potassium constituents produced in step (a).

11. A process as defined in claim 8 wherein said sulfurous acid solution is produced by dissolving sulfur dioxide in water and wherein said sulfur dioxide is obtained by burning a portion of the hydrogen sulfide produced during said catalytic steam gasification process.

* * * * *